United States Patent [19]

Brault et al.

[11] Patent Number: 5,410,870
[45] Date of Patent: May 2, 1995

[54] AIRCRAFT ENGINE LAYOUT

[75] Inventors: Michel G. R. Brault, Boussy St Antoine; Georges Mazeaud, Yerres; Jean-Marie N. Pincemin, Crosne; Pascal C. Wurniesky, Savigny le Temple, all of France

[73] Assignee: Societe Nationale d'Etude et de Construction de Moteurs d'Aviation "SNECMA", Paris, France

[21] Appl. No.: 158,266

[22] Filed: Nov. 29, 1993

[30] Foreign Application Priority Data

Dec. 9, 1992 [FR] France ................... 92 14815

[51] Int. Cl.⁶ .............. F02C 7/04; F02C 7/12
[52] U.S. Cl. .................. 60/39.33; 60/39.83; 244/53 B
[58] Field of Search ............ 60/226.1, 226.3, 39.33, 60/39.83; 137/15.1, 15.2; 244/53 B

[56] References Cited

U.S. PATENT DOCUMENTS

| | | | |
|---|---|---|---|
| 2,400,714 | 5/1946 | Rowledge et al. | 60/39.33 |
| 2,441,135 | 5/1948 | Chalupa | 60/39.33 |
| 2,548,858 | 4/1951 | Benedict | 60/39.33 |
| 2,618,119 | 11/1952 | Redding et al. | |
| 3,859,785 | 1/1975 | Leto et al. | |
| 5,123,242 | 6/1992 | Miller | 60/226.1 |

FOREIGN PATENT DOCUMENTS 1816064 7/1969 Germany .
796400 6/1958 United Kingdom .

*Primary Examiner*—Louis J. Casaregola
*Attorney, Agent, or Firm*—Oblon, Spivak, McClelland, Maier, & Neustadt

[57] ABSTRACT

Aircraft engine, whose ancillary equipment forms a unitary assembly wherein the equipment is located to the rear of the air intake duct in a substantially closed central compartment just upstream of the gas generator. The equipment positioned along the engine axis, which, inter alia, leads to low engine drag in operation.

3 Claims, 2 Drawing Sheets

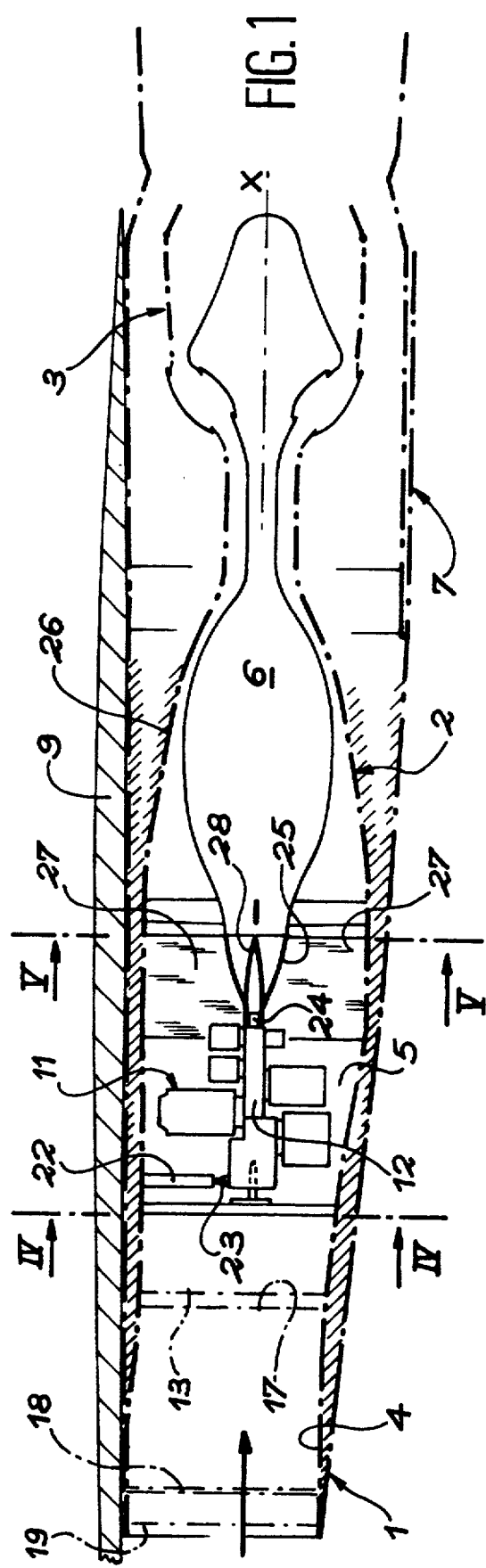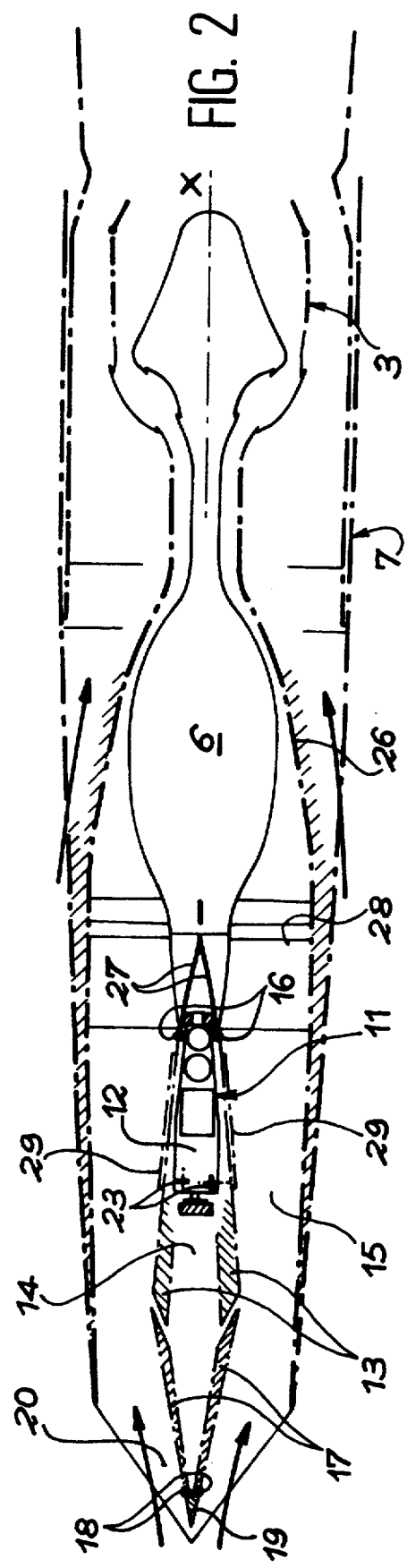

AIRCRAFT ENGINE LAYOUT

BACKGROUND OF THE INVENTION

FIELD OF THE INVENTION

The invention relates to an aircraft engine layout and, more particularly a layout formed by an air intake duct, a gas generator responsible for the engine thrust, an exhaust nozzle and ancillary equipment. This equipment, more particularly is used for regulating the gas generator and supplying power to the same and among which reference can be made to the regulator, fuel pump, hydraulic pumps, lubricating means, starters and electrical means, which are normally positioned around the remainder of the engine, whereas the intake duct, gas generator and exhaust nozzle are placed on a common axis so as not to impede the flow of air and gases formed. This leads to an irregularity in the external shape of the engine and to an increase in its perimeter in certain sections, which increases the aircraft drag. This situation is admissible for subsonic aircraft, but is not admissible for supersonic aircraft. Therefore a new aircraft engine element configuration has been conceived.

SUMMARY OF THE INVENTION

According to the invention, the engine is characterized in that the ancillary equipment is located on the engine axis and in a compartment of the air intake duct adjacent to the gas generator and defined by an envelope isolating the compartment from a peripheral area of the duct used for the circulation of air to the generator. In addition, the envelope is formed by a pair of substantially parallel, longitudinal flaps. Thus, the equipment is well integrated with the engine and close to the means with which they cooperate and are protected by the air intake duct without compromising the quality of the air flow, which easily passes round it by sliding on the flaps. These flaps can advantageously pivot about axes located at the junction of the duct and the generator in order to widen or narrow the peripheral areas or achieve the optimum engine operation under all operating conditions and speeds by regulating the airflow characteristics. It is then possible to complete the pair of flaps by a second pair, formed by flaps pivoting about axes positioned upstream of the duct, the four flaps having almost pairwise contiguous free ends, the flaps of the second pair being directed substantially longitudinally, while being close together with respect to their rotational axes.

A simple manner of placing the equipment in the compartment consists of assembling it and providing it with means for being fixed in two opposite areas of the assembly, at a rear area wherein the equipment is fixed to the generator, preferably by a centering nesting system which can be a sphere nesting, while the front area is advantageously fixed by bolting to ribs located across the duct.

The drag of the engine is significantly reduced as compared with existing solutions if the engine has a pod enveloping the exhaust nozzle, the gas generator and the air intake duct. Finally, a region of the duct surrounding the compartment can be defined by a shell formed by separable elements connected to a ferrule of the gas generator, which externally defines a gas stream, in order to provide easy access to the ancillary equipment.

BRIEF DESCRIPTION OF THE DRAWINGS

Various other objects, features and attendant advantages of the present invention will be more fully appreciated as the same becomes better understood from the following detailed description when considered in connection with the accompanying drawings in which like reference characters designate like or corresponding parts throughout the several views and wherein:

FIG. 1 shows a longitudinal and vertical section of the engine.

FIG. 2 shows a longitudinal and horizontal section of the engine.

DESCRIPTION OF THE PREFERRED EMBODIMENTS

Figure 3:
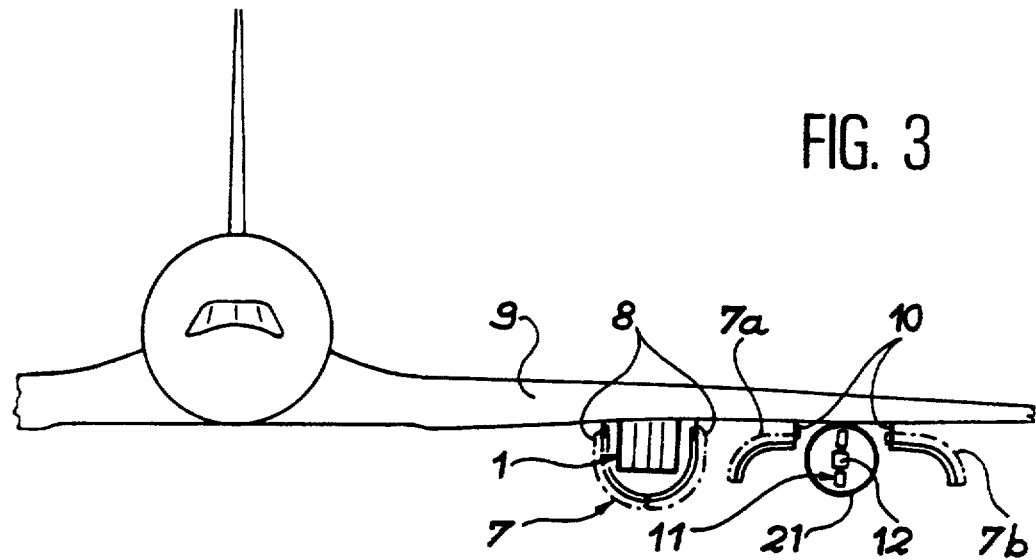
FIG. 3 illustrates a front view of the engine showing the equipment compartment.

Consideration will firstly be given to FIGS. 1 and 2. From the front to the rear, the engine successively comprises an air intake duct 1, a gas generator 2 and a exhaust nozzle 3 located on a common axis X. The air duct 1 is constituted by an intake region 4 at the front and a connecting region 5 contiguous with the gas generator 2 and which essentially consists of a compressor 6 and whereof certain elements will be described hereinafter. The choice of gas generator 2 normally has no affect on the invention, even when used with widely differing engine types, but as it is mainly intended to use it for supersonic aircraft, the engine will generally be a variable cycle engine such as the MCV 99, able to assume different states as a function of the flight phase reached and produce vertical thrusts on take-off as a result of supplementary blast pipes which are directed downwards or have a variable orientation.

The air intake duct 1, the gas generator 2 and the exhaust nozzle 3 are enveloped by a smooth pod 7, which is rounded at the bottom and provided with vertical sides 8 suspended on an aircraft wing 9, as can be seen in FIG. 3. The pod 7 is formed from two symmetrical halves 7a, 7b, which it is permissible to separate by detaching the assembly means linking them by a lower median line and by making them rotate about longitudinal hinges connecting them to suspension posts 10 of the aircraft wing 9. The aircraft engine is then revealed. The pod 7 has a section which varies to a minimum extent so as to ensure minimum engine drag.

The connection region 5 contains the ancillary equipment 11 of the engine, the most important of which have already been listed. They are assembled to form a unitary and compact assembly concentrated around an extension the axis X by bolted joints which attach them together or to a central compartment 12, which may optionally be reduced to a single spar. The equipment 11 is housed in a compartment 14 between two diffusion flaps 13 and two air circulation zones 15 are positioned outside the diffusion flaps 13 and on either side of the central compartment 12. Their cross sectional area increases towards the rear of the engine. The diffusion flaps 13, which are similar and positioned in a vertically symmetrical manner, are articulated by their rear ends to vertical hinges 16 located at the junction of the gas generator 2 and can open or close in order to widen or narrow the zones 15 and thus modify the air diffusion characteristics in the engine. However, the diffusion flaps 13 remain substantially longitudinal. They cooperate with a pair of compression flaps 17 articulated by their front ends to the wall of the intake region 4 of the air intake duct 1 by means of vertical hinges 18. The free ends of the flaps 13 and 17 are almost contiguous and partly overlap so as not to compromise the continuity of the air passage streams. They are bevelled so as to be able to optionally slide on one another if e.g. the diffusion flaps 13 are controlled by actuating mechanisms and if the compression flaps 17 are simply pressed onto them by springs. The hinges 18 are very close together and the compression flaps 17 open towards the rear in order to somewhat constrict the air passage stream, although their orientation remains substantially longitudinal. A nose 19 positioned upstream of the hinges 18 substantially in the extension of the front flaps 17 completes the closing of the central space enveloped by the flaps 13 and 17 and which in particular incorporates the compartment 14. The nose 19 is located on a stem portion 20 of the wall of the intake region 4, which is scalloped on its sides in order to facilitate the entry of air.

Figure 4:
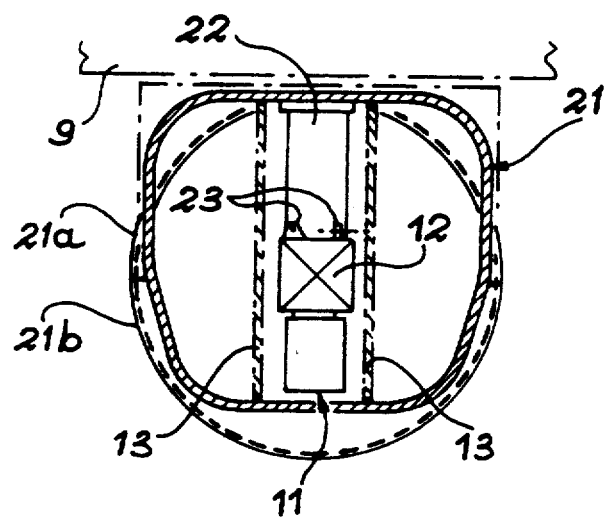
FIG. 4 & 5 show two of the engine taken respectively along lines IV—IV and V—V of FIG. 1.
Figure 5:
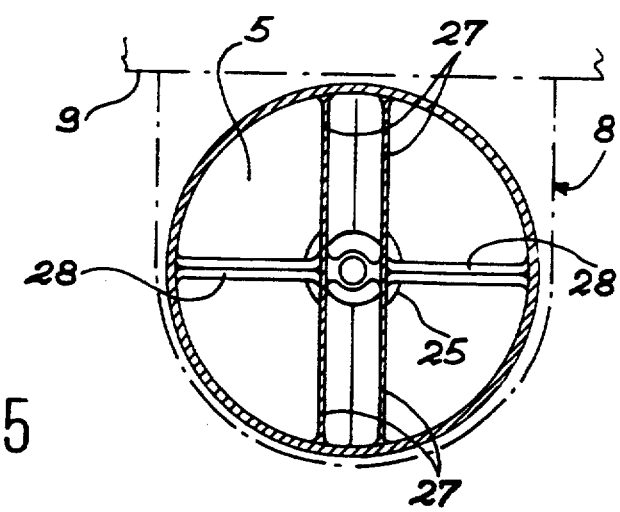

The wall of the intake region 4 is connected by its longitudinal ends to an external ferrule 26 of the gas generator 2 by a detachable rear portion or shell 21, which surrounds the compartment 14 and the lateral zones 15 in order to maintain the continuity of the airflow and which is shown in FIG. 4. The shell 21 is formed by two halves 21a, 21b joined at a midheight position by a horizontal plane. In order to remove the shell 21 it is only necessary to detach the halves thereof from the inner ferrule 26 and the wall of the intake region 4 and separate the same, because the shell 21 is not directly connected to the aircraft wing 9 by a suspension member. Two vertical ribs 22 are fixed to the top of the upper half 21a, each of which carries a suspension point 23 at the front of the assembly of the equipment 11. The central compartment 12 has a hemispherical impression 24 at its rear end, which is engaged on a hemispherical boss of the same diameter located at the entrance of an internal ferrule 25 of the gas generator 2. The stability of the position of this boss and the ferrules 25, 26 of the gas generator 2, between which the air enters in order to supply the compressor 6, is ensured by two large vertical arms 27 and two smaller horizontal arms 28, which stiffen the assembly. These are sections having two substantially longitudinal webs. The cross-like arrangement resulting from this is clearly visible in FIG. 5.

The diffusion flaps 13 are provided with panels 29 which are detachable prior to the assembly of the equipment 11, which it is merely necessary to dismantle after opening the pod 7 and the shell 21 to obtain access to the equipment 11 for maintenance purposes.

Apart from the improved flight performance characteristics obtained by reducing drag, the invention facilitates maintenance by concentrating the location of the equipment 11 and by their relative separation from the remainder of the structure, the freedom of the arrangement of the respective equipment 11 due to the compartment 14 being reserved for it and having an adequate volume to modify the arrangement of the equipment 11 or add further items, a movement towards the center of gravity of the engine on the part of the aircraft wing 9, the elimination or shortening of certain transmission mechanisms between the equipment 11 and the engine components, as well as specific ventilation systems for the equipment 11, because the air entering the duct 1 can effectively cool then. Openings can be provided for this purpose through the flaps 13 or 17.

Obviously, numerous modifications and variations of the present invention are possible in light of the above teachings. It is therefore to be understood that within the scope of the appended claims, the invention may be practiced otherwise than as specifically described herein.

We claim:

1. Aircraft engine having an air intake duct and a gas generator, which comprises:

a compressor;

an exhaust nozzle located on a common axis with said compressor;

ancillary equipment for regulating the gas generator and supplying the generator with fuel and lubricant, the ancillary equipment being located in a compartment of the air intake duct adjacent to the gas generator and defined by an envelope isolating the compartment from a peripheral zone of the duct used for air circulation to the generator, wherein the envelope comprises a pair of substantially parallel, longitudinal flaps, wherein the flaps are pivotable about axes located at the junction of the duct and the generator in order to widen or narrow the peripheral zones wherein the air intake duct has a second pair of flaps which are pivotable about axes located to the front of the duct, wherein end portions of the first and second pair of flaps are respectively substantially contiguous ends and wherein the flaps of the second pair of flaps are directed substantially longitudinally while being close at the axes.

2. Aircraft engine having an air intake duct and a gas generator, which comprises:

a compressor;

an exhaust nozzle located on a common axis with said compressor;

ancillary equipment for regulating the gas generator and supplying the generator with fuel and lubricant, the ancillary equipment being located in a compartment of the air intake duct adjacent to the gas generator and defined by an envelope isolating the compartment from a peripheral zone of the duct used for air circulation to the generator, wherein the envelope comprises a pair of substantially parallel, longitudinal flaps located in said air intake duct, and a plurality of ribs positioned across the air intake wherein the ancillary equipment forms a unitary assembly having an attachment mechanism in a front zone and a rear zone which are opposite one another; the rear zone being fixed to the gas generator and the front zone being fixed to the ribs positioned across the air intake duct.

3. Aircraft engine according to claim 2, wherein a rear portion of the equipment is fixed to the gas generator and a front portion of the equipment is bolted to the ribs.

* * * * *